United States Patent [19]

Yamamura et al.

[11] Patent Number: 5,318,860
[45] Date of Patent: Jun. 7, 1994

[54] INORGANIC FIBER SINTER AND PROCESS FOR PRODUCING SAME

[75] Inventors: Takemi Yamamura; Masaki Shibuya; Hideki Ohtsubo; Tooru Hiratuka, all of Ube, Japan

[73] Assignee: UBE Industries, Ltd., Ube, Japan

[21] Appl. No.: 922,969

[22] Filed: Jul. 31, 1992

[30] Foreign Application Priority Data

Aug. 14, 1991 [JP]  Japan ............................... 3-288202

[51] Int. Cl.$^5$ ............................................. B32B 09/00
[52] U.S. Cl. ...................................... 428/688; 428/689;
428/698; 428/699; 428/702; 428/367; 428/372;
428/375; 428/241; 428/325; 501/35; 501/38;
501/91; 501/95; 501/99; 501/103
[58] Field of Search ................ 501/35, 38, 91, 95,
501/99, 103; 428/367, 368, 372, 375, 388, 392,
697, 698, 699, 241, 325, 688, 689, 702

[56] References Cited

U.S. PATENT DOCUMENTS

| | | | |
|---|---|---|---|
| 4,778,722 | 10/1988 | Yamamura et al. | 428/367 |
| 5,079,196 | 1/1992 | Arfsten et al. | 501/95 |
| 5,098,494 | 3/1992 | Reisman | 156/89 |
| 5,240,888 | 8/1993 | Yamamura et al. | 501/95 |

FOREIGN PATENT DOCUMENTS

| | | |
|---|---|---|
| 0021844 | 1/1981 | European Pat. Off. . |
| 0030145 | 2/1984 | European Pat. Off. . |
| 0162596 | 11/1985 | European Pat. Off. . |
| 0246104 | 11/1987 | European Pat. Off. . |
| 0315177 | 5/1989 | European Pat. Off. . |
| 57-26527 | 6/1982 | Japan . |
| 61-49334 | 10/1986 | Japan . |
| 62-289614 | 12/1987 | Japan . |
| 2-74571 | 3/1990 | Japan . |
| 2-39468 | 9/1990 | Japan . |

Primary Examiner—Patrick J. Ryan
Assistant Examiner—Marie R. Macholl
Attorney, Agent, or Firm—Frishauf, Holtz, Goodman & Woodward

[57] ABSTRACT

An inorganic fiber sinter consists essentially of (a) an inorganic substance (I) selected from the group consisting of (i) an amorphous substance consisting essentially of Si, M, C and O, (ii) an agglomerate consisting essentially of crystalline ultrafine particles of $\beta$-SiC, MC, a solid solution of $\beta$-SiC with MC and/or MC$_{1-x}$, and amorphous SiO$_2$ and MO$_2$, and (iii) a mixture of the above amorphous substance (i) and the agglomerate (ii), and (b) an inorganic substance (II) selected from the group consisting of (iv) an amorphous substance consisting essentially of Si, M and O, (v) a crystal agglomerate consisting essentially of crystalline SiO$_2$ and MO$_2$, and (iv) a mixture of the amorphous substance (iv) and the crystal agglomerate (v), wherein M is Ti or Zr and x is a number of more than 0 to less than 1. Due to its high uniformity and high strength, the sinter is used mainly for internal combustion engine parts such as a piston ring and an auxiliary combustion chamber, and rocket engine parts such as a nose cone and a nozzle.

4 Claims, 2 Drawing Sheets

INORGANIC FIBER SINTER AND PROCESS FOR PRODUCING SAME

BACKGROUND OF THE INVENTION

1. Field of the Invention

The present invention relates to an inorganic fiber sinter having high strength and toughness and to a process for producing the sinter. More particularly it pertains to an inorganic fiber sinter to be used mainly for internal-combustion engine parts such as a piston ring and an auxiliary combustion chamber, rocket engine parts such as a nose cone and a nozzle, and the like, and a process for producing the sinter.

2. Description of the Prior Art

There have been developed inorganic fiber-reinforced ceramics and inorganic fiber-reinforced glasses as a material for high-temperature service having high toughness and high heat resistance. Among them, silicon carbide fiber-reinforced lithium silicate glass is characterized by its having a fracture toughness value $K_{IC}$ as high as 10 to 27 $MNm^{-3/2}$ and its capability of maintaining its strength up to 1100° C. in the air. However, this glass involves the problem that the strength thereof markedly decreases at 1200° C. or higher because of the insufficient heat resistance of the matrix thereof.

Accordingly, if the content of the matrix can be extremely reduced, that is, if the volumetric content of the fiber in the fiber-reinforced composite material can be considerably increased, it is expected that the aforementioned problem can be solved.

However, according to the conventional processes known as the means for producing long fiber-reinforced ceramics or long fiber-reinforced glasses, such as the CVI process, sol-gel process or slurry impregnation process, the volumetric content of the fiber is generally limited to 70% as the upper limit. Thus it is recognized that an attempt to increase the volumetric content of the fiber so as to exceed the above limit tends to bring about nonuniform distribution of the reinforcing fibers in the composite material, thus impairing the uniformity of the composite material.

In the Japanese Patent Publication No. 39468/1990 filed by the present inventors, there is disclosed a composite material of fiber-reinforced ceramics which comprises an inorganic fiber and a reinforcement, said inorganic fiber comprising:

(1) an amorphous substance consisting substantially of Si, M, C and O, (2) an agglomerate consisting substantially of crystalline ultrafine particles of $\beta$-SiC, MC, solid solution of $\beta$-SiC with MC and/or $MC_{1-x}$, and amorphous $SiO_2$ and $MO_2$, or (3) a mixture of the above amorphous substance (1) and agglomerate (2), wherein M is Ti or Zr and x is 0 to less than 1. The composite material contains a carbide, nitride, oxide, glass ceramic or the like as the matrix.

In the above-mentioned patent, there are disclosed alumina, silica, magnesia, mullite and cordierite as specific examples of the oxide ceramics, and borosilicate glass, high silica glass and aluminosilicate as specific examples of glass ceramics. The sinters described in the aforesaid patent are obtained by heating a mixture of an inorganic fiber and a powder for matrix having a composition different from the fiber and therefore, limited in regard to the strength and toughness.

In Japanese Patent Laid-Open No. 74571/1990 is disclosed a sinter obtained by heating a laminate consisting of the above inorganic fiber alone at a high temperature and having surpassingly high flexural strength and toughness as compared with the conventional inorganic fiber-reinforced ceramics.

In the process for producing the above-mentioned sinter, lumpy, flaky or acicular crystals are formed by heat-sintering a laminate at a high temperature and the gaps between the inorganic fibers are filled in by deforming the cross section into a polygon. In order to obtain a structurally uniform sinter, it is necessary in the sintering step to uniformly remove from the surface and inside of the laminate the gases produced by the decomposition of the inorganic fibers constituting the laminate. However, as the laminate gets bulky, it becomes difficult to remove the gases uniformly from all the parts of the laminate, resulting in a nonuniform sinter different in the structure between the inside and surface thereof. Consequently the resultant sinter is apt to be lowered in strength and toughness.

SUMMARY OF THE INVENTION

It is the first object of the present invention to provide an inorganic fiber sinter enhanced in strength and toughness in which the inorganic fiber structure is uniformly sintered and a process for producing the sinter.

It is the second object of the present invention to provide an inorganic fiber sinter having a high volumetric content of fibers in the inorganic fiber structure free from nonuniform distribution of the reinforcing fibers in the structure and a process for producing the sinter.

In order to attain the first object, the present invention provides an inorganic fiber sinter which comprises an inorganic substance (I) maintaining a fibrous form selected among the following members (i) to (iii) and an inorganic substance (II) which fills the gaps between the above described inorganic substances (I) which is selected among the following members (iv) to (vi):

(i) an amorphous substance consisting essentially of Si, M, C and O, (ii) an agglomerate consisting essentially of crystalline ultrafine particles comprising $\beta$-SiC, MC, solid solution of $\beta$-SiC with MC and/or $MC_{1-x}$, and amorphous $SiO_2$ and $MO_2$, and (iii) a mixture of the above amorphous substance (i) and agglomerate (ii), (iv) an amorphous substance consisting essentially of Si, M and O, (v) a crystal agglomerate consisting of crystalline $SiO_2$ and $MO_2$, and (vi) a mixture of the above amorphous substance (iv) and crystal agglomerate (v), wherein M is Ti or Zr and x is a number of more than 0 to less than 1.

The present invention also provides a process for producing an inorganic fiber sinter which comprises sintering an inorganic fiber agglomerate by heating at a temperature in the range of 1400° to 1900° C., said agglomerate comprising an inside part and a surface part different from each other in inorganic fiber structure, said inside part consisting of a substance selected among the following members (i) to (iii):

(i) an amorphous substance consisting essentially of Si, M, C and O, (ii) an agglomerate consisting essentially of crystalline ultrafine particles having a particle size of 50 nm or smaller and comprising β-SiC, MC, solid solution of β-SiC with MC and/or $MC_{1-x}$ and amorphous $SiO_2$ and $MO_2$, and (iii) a mixture of the above amorphous substance (i) and agglomerate (ii), said surface part consisting of an inorganic substance selected from the following members (iv) to (vi):

(iv) an amorphous substance consisting essentially of Si, M and O, (v) a crystal aggregate consisting of crystalline $SiO_2$ and $MO_2$, and (vi) a mixture of the above amorphous substance (iv) and crystal agglomerate (v), wherein M is Ti or Zr and x is a number of more than 0 to less than 1.

In order to achieve the above-mentioned second object, the present invention provides an inorganic fiber sinter which comprises an inorganic substance (III) maintaining a fibrous form selected from the following members (A) to (C) and an inorganic substance (IV) which fills the gaps between the above described inorganic substances (III) which is selected among the following members (D) to (F):

(A) an amorphous substance consisting essentially of Si, C and O, (B) an agglomerate consisting essentially of crystalline ultrafine particles of β-SiC and amorphous $SiO_2$, (C) a mixture of the above amorphous substance (A) and agglomerate (B), (D) an amorphous substance consisting essentially of Si and O, (E) a crystal agglomerate consisting of crystalline $SiO_2$, and (F) a mixture of the above amorphous substance (D) and crystal agglomerate (E).

The present invention also provides a process for producing an inorganic fiber sinter which comprises sintering an inorganic fiber agglomerate by heating at a temperature in the range of 1400° to 1900° C., said agglomerate comprising an inside part and a surface part different from each other in inorganic fiber structure, said inside part consisting of a substance selected from the following members (A) to (C):

(A) an amorphous substance consisting essentially of Si, C and O, (B) an agglomerate consisting essentially of crystalline particles of β-SiC having a particle size of 50 nm or smaller and amorphous $SiO_2$, and (C) a mixture of the above amorphous substance (A) and agglomerate (B), said surface part consisting of an inorganic substance selected from the following members (D) to (F):

(D) an amorphous substance consisting essentially of Si and O, (E) a crystalline agglomerate consisting of crystalline $SiO_2$, and (F) a mixture of the above amorphous substance (D) and crystal agglomerate (E).

DETAILED DESCRIPTION OF THE INVENTION

The inorganic fiber sinter according to the present invention comprises an (a) inorganic fiber (an inorganic substance maintaining a fibrous form) substantially containing carbon which is selected from the following: an amorphous substance (i), an agglomerate (ii) and a mixture (iii) and an (b) inorganic substance containing 5% or less by weight of carbon which fills the gaps between the above described fibers and is selected for the following: an amorphous substance (iv), a crystal agglomerate (v) and a mixture (vi).

Specifically, the aforesaid inorganic fiber may be an amorphous substance (i) consisting essentially of Si, M, C and O, an agglomerate (ii) consisting essentially of crystalline ultrafine particles comprising β-SiC, MC, solid solution of β-SiC with MC and/or $MC_{1-x}$, and amorphous $SiO_2$ and $MO_2$, or a mixture (iii) of the above described amorphous substance and agglomerate. As to the proportion of each of the elements constituting the inorganic fiber in the above described members (i) to (iii), the inorganic fiber comprises 30 to 60 wt % of Si, 0.5 to 35 wt %, preferably 1 to 10 wt % of M, 25 to 40 wt % of C and 0.01 to 30 wt % of O. The size of the crystalline ultrafine particle is preferably 50 nm or smaller in the above described member (ii). The inorganic fibers after sintering may be in contact with each other or away from each other by a distance corresponding to 10% of the diameter thereof. In this case, it is understandable that the volumetric content of the inorganic fibers in the sinter is about 75% by volume based on the assumption that the cross section of the fiber is perfectly circular. Accordingly, the distance between the inorganic fibers is preferably 3% or less of the diameter thereof, and the volumetric content of the inorganic fibers in the sinter is preferably in the range of 85 to 99%.

Figure 1:
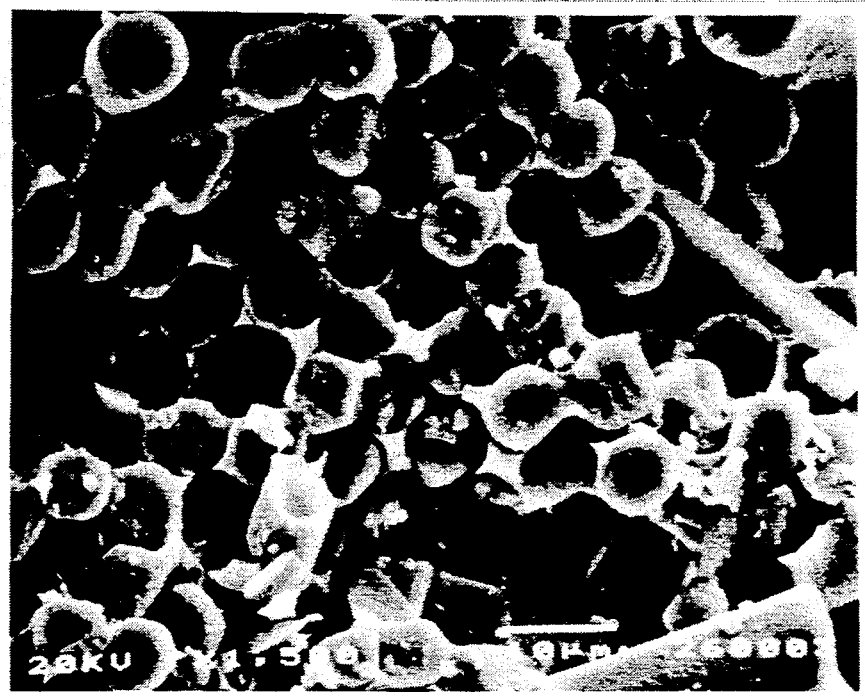
FIG. 1 is a micrograph showing the fracture of the sinter obtained in Example 1.

The cross section of the inorganic fiber may be circular or polygonal derived from a partially deformed circle as is apparent from the cross-sectional structure of the sinter in FIG. 1 obtained from Example 1 which will be described hereinbelow. The diameter of the inorganic fiber is preferably 5 to 20 μm.

The inorganic substance which fills the gaps between the inorganic fibers may be an amorphous substance (iv) consisting essentially of Si, M and O, a crystal aggregate (v) consisting of crystalline $SiO_2$ or a mixture (vi) thereof. With regard to the proportion of each of the elements constituting the inorganic substance in the above members (iv) to (vi), the inorganic substance comprises 20 to 65 wt % of Si, 0.3 to 40 wt %, preferably 1 to 15 wt % of M, 30 to 55 wt % of O, and 0 to 5 wt % of C. The inorganic substance fills in the gap formed by the inorganic fibers in the sinter. In the above members (i) to (vi), M is Ti or Zr and x is a number of more than 0 to less than 1.

The inorganic fiber sinter having such a structure is strong and tough because of a uniformly sintered structure of the inorganic fibers.

Now the process for producing the inorganic fiber sinter of the present invention will be described.

The inorganic fiber to be used as the starting material in the present invention is prepared by the process described in the publicly known European Patent No. 30145 and Japanese Patent Laid-Open No. 289,614/1987, starting with the production of a burnt fiber.

Specifically, an organometallic polymer suitably containing the elements constituting the above members (i) and (ii) and comprising a polycarbosilane and a polymetalosiloxane having metaloxane bonds-(M-O-)- is produced and spun. The resultant spun fiber is infusibilized and burnt at 800° to 1800° C. in an atmosphere of an inert gas to produce a burnt fiber.

The burnt fiber comprises an inorganic fiber selected among (i) an amorphous substance consisting essentially of Si, M, C and O;

(ii) an agglomerate consisting essentially of crystalline ultrafine particles having a particle size of 50 nm or smaller and comprising $\beta$-SiC, MC, solid solution of $\beta$-SiC with MC and/or $MC_{1-x}$, and amorphous $SiO_2$ and $MO_2$; and (iii) a mixture of the above described amorphous substance (i) and agglomerate (ii).

The inorganic fiber comprising the above described members (i), (ii), (iii) (M:Ti) is available from Ube Industries Ltd. under the tradename "Chirano Fiber" in the market.

The inorganic fiber thus obtained is heat-treated at 500° to 1600° C. in an oxidative atmosphere to oxidize the surface to form a surface part comprising the inorganic substance consisting of (iv) an amorphous substance consisting essentially of Si, M and O, (v) a crystal aggregate consisting of crystalline $SiO_2$ and $MO_2$, or (vi) a mixture of the above described amorphous substance (iv) and crystal agglomerate (v).

Specifically, the heat-treated inorganic fiber consists of an inside part comprising the fibrous inorganic substance of the above described members (i), (ii) or (iii) and a surface part comprising the inorganic substance of the above described members (iv), (v) or (vi).

Examples of the oxidative atmosphere include air, pure oxygen, ozone, steam, carbon dioxide or the like.

The proportions of the constitutional elements in the inside and surface parts are the same as those in the inorganic fiber and the inorganic substance in the above sinter, respectively.

The inorganic fiber has a diameter of 5 to 20 $\mu$m and a thickness of 50 to 1000 nm in the surface part.

The inorganic fiber according to the present invention may be used in the form of a continuous fiber, an agglomerate of chopped short fibers formed from cut continuous fibers, a plain weave fabric knitted from the continuous fibers, a three-dimensional fabric, continuous fibers unidirectionally arranged into a sheet or the like.

In the present invention the a sinter excellent in strength and toughness can be obtained by forming an inorganic fiber laminate and heat-sintering the laminate after or simultaneously with the molding of the same into a desired form.

The sintering may be carried out by various methods including sintering under elevated, ordinary or reduced pressure after the primary molding of the laminate and the hot pressing method in which sintering is effected simultaneously with molding.

In the method wherein the primary molding is carried out separately from sintering, the primary molding may be put into practice by the die press method, the rubber press method, the extrusion method or the sheet method by pressing at 100 to 5000 kg/$cm^2$ to give a desired shape including a sheet, a rod, a sphere, etc.

In the case of sintering by hot pressing, the laminate is pressed into an embossing die made of graphite under a pressure of 2 to 2000 kg/$cm^2$ by the use of a boron nitride spray as the mold release agent simultaneously with heating to produce a sinter.

The sintering temperature ranges from 1400° C. to 1900° C., since the heating of the laminate in the above range enables the production of the aforesaid sinter having high strength and toughness. A sintering temperature lower than 1400° C. may result in the failure to fill in the gaps among the inorganic substances, whereas one exceeding 1900° C. makes it difficult to obtain a sinter having an internally uniform structure because of the release to the outside of the system of the gas generated by the decomposition of the inorganic fiber.

As an atmosphere in the sintering step, there is available an atmosphere of a vacuum, an inert gas, a reducing gas or a hydrocarbon gas.

Now the inorganic fiber sinter for the purpose of attaining the second object of the present invention will be described.

The inorganic fiber sinter attaining the second object of the present invention comprises an inorganic fiber which comprises an inorganic substance maintaining the fibrous form substantially containing carbon and selected among the following: an amorphous substance (A), an agglomerate (B) and a mixture (C) thereof and an inorganic substance which fills the gaps between the above described fibers and containing 5% or less by weight of carbon selected from an amorphous substance (D), a crystal agglomerate (E) and a mixture (F) thereof.

Specifically, the inorganic fiber may be an amorphous substance (A) consisting essentially of Si, C and O, an amorphous agglomerate or substance or an agglomerate (B) each consisting essentially of crystalline particles of $\beta$-SiC and amorphous $SiO_2$, or a mixture (C) thereof. Regarding the proportion of each of the elements constituting the inorganic fiber in the above described members (A) to (C), the inorganic fiber comprises 30 to 60 wt % of Si, 25 to 40 wt % of C, and 0.01 to 30 wt % of O. The size of the crystalline particle is preferably 50 nm or smaller in the above member (B).

As is the case with the aforesaid inorganic fiber sinter the distance between the inorganic fibers is preferably 3% or less of the diameter thereof, and the volumetric content of the inorganic fibers in the sinter is preferably in the range of 85 to 99%.

The cross section of the inorganic fiber may be circular or polygonal derived from a partially deformed circle. The diameter of the inorganic fiber is 5 to 30 $\mu$m.

The inorganic substance which fills the gaps between the inorganic fibers may be an amorphous substance (D) consisting essentially of Si and O, crystalline $SiO_2$ (E) or a mixture (F) thereof. With regard to the proportion of each of the elements constituting the inorganic substance in the above described members (D) to (F), the inorganic substance comprises 20 to 65 wt % of Si, 30 to 60 wt % of O and 5 wt % of C. The inorganic substance fills in the gap formed by the inorganic fibers in the sinter.

The inorganic fiber sinter having such a structure has a high volumetric content of the fibers in the structure of the inorganic fiber, and the structure is free from nonuniform distribution of the reinforcing fibers.

Now the process for producing the inorganic fiber sinter of the present invention will be described.

The inorganic fiber to be used as the starting material in the present invention is prepared by the processes described in Japanese Patent Publication Nos. 26527/1982 and 49334/1986, starting with the production of a burnt fiber.

The burnt fiber comprises the inorganic fiber selected from (A) an amorphous substance consisting essentially of Si, C and O, (B) an agglomerate consisting essentially of crystalline particles of β-SiC having a particle size of 50 nm or smaller and amorphous $SiO_2$, and (C) a mixture of the above described amorphous substance (A) and agglomerate (B).

Then, the inorganic fiber thus obtained is heat-treated at 500° to 1600° C. in an oxidative atmosphere to oxidize the surface to form a surface part comprising the inorganic substance consisting of (D) an amorphous substance consisting essentially of Si and O, (E) a crystalline $SiO_2$, or (F) a mixture of the above described members (D) and (E).

The inorganic fiber has a diameter of ordinarily 5 to 30 μm and a thickness of generally 50 to 1000 nm in the surface part.

This fiber is formed into a woven or nonwoven fabric in the form of a sheet, which is laminated and sintered to produce the inorganic fiber sinter of the present invention.

Now the present invention will be described with reference to the following Examples, which however shall not limit the present invention thereto.

Example 1

Chirano fibers (tradename of Ube Industries Ltd., consisting of 53 wt % of Si, 2 wt % of Ti, 32 wt % of C and 13 wt % of O) of 8.5 μm in diameter was heat-treated at 110° C. in the air for 30 minutes to provide an inorganic fiber as the starting material, which had a 200 nm thickness of the surface part of the inorganic substance formed on the surface thereof.

The plain weave fabric consisting of the fibers was laminated into a sheet-like laminate of 50×100×100 mm, which was set in a carbon die and hot-pressed at 1600° C. in a stream of argon under a pressure of 600 kg/cm² for 5 hours to produce a sinter.

The resultant sinter had a flexural strength of 60 kg/mm² at room temperature and 70 kg/mm² at 1400° C. and a density of 2.6 g/cm³. As a result of observation of the fracture of the sinter with a surface-reflection electron microscope, the sinter had a structure in which the partially deformed fibrous inorganic fibers were bonded to each other via the inorganic substance existing in the interface (gap) as shown in FIG. 1, while maintaining the fiber orientation of the plain weave fabric.

Comparative Example 1

The procedure of the Example 1 was repeated except that the Chirano fiber of 8.5 μm in diameter was employed as such without heat treatment in the air.

Figure 3:
FIG. 3 is a micrograph showing the fracture of the sinter obtained in Comparative Example 1.

The resultant sinter had a flexural strength of 40 kg/mm² at room temperature and 45 kg/mm² at 1400° C. and a density of 2.5 g/cm³. As a result of observation of the fracture of the sinter with a microscope, gaps remained among the fibrous substances themselves as shown in FIG. 3.

Comparative Example 2

The procedure of the Example 1 was repeated except that the plain weave fabric was hot-pressed at 1950° C. instead of 1600° C.

The resultant sinter had a flexural strength of 45 kg/mm² at room temperature and 55 kg/mm² at 1400° C. and a density of 2.9 g/cm³. As a result of microscopic observation, the sinter left the trace of gas release from the end thereof, making the sinter nonuniform.

Preparation for Example 2

Referential Example 1

A 5-l flask was charged with 400 g of sodium in 2.5 l of anhydrous xylene and the mixture was heated to the boiling point of xylene in a stream of nitrogen gas. Dimethyldichlorosilane was added dropwise thereto over a period of 1 hour in a total amount of 1 l. After the completion of the dropwise addition, the mixture was heated under reflux for 10 hours to form precipitates, which were filtered and washed with methanol and then with water to afford 420 g of polydimethylsilane in the form of white powder.

Separately, a mixture of 759 g of diphenyldichlorosilane and 124 g of boric acid was heated at 100° to 120° C. in n-butyl ether in a nitrogen gas atmosphere to form a white resinous matter, which was then heated at 400° C. for 1 hour in a vacuum to afford 530 g of polyborodiphenylsiloxane.

Then, a blend of 250 g of the above polydimethylsilane with 8.27 g of the above polyborodiphenylsiloxane was polymerized at 350° C. for 6 hours in a stream of nitrogen in a 2-l quartz tube equipped with a reflux tube. The resultant polymer was allowed to cool to room temperature, taken out as the solution thereof in xylene, followed by the evaporation of xylene and concentration at 320° C. for 1 hour in a stream of nitrogen to provide polycarbosilane.

The resultant polycarbosilane was melt-spun, heated in the air up to 170° C. at a temperature rise rate of 20° C./hour to infusiblize the fibers, then heated to 1000° C. at a temperature rise rate of 200° C./hour in a nitrogen atmosphere, maintained at 1000° C. for 1 hour and then cooled to provide inorganic fibers of 10 μm in diameter consisting of β-SiC and amorphous $SiO_2$.

Example 2

The inorganic fibers obtained in the Referential Example 1 was heat-treated at 1100° C. for 180 minutes in the air to afford inorganic fibers as the starting material, which had a 500 nm thickness of the surface part of the inorganic substance formed on the surface of the fiber.

The plain weave fabric consisting of the fibers was laminated into a sheet-like laminate of 50×100×100 mm, which was set in a carbon die and hot-pressed at 1600° C. in a stream of argon under a pressure of 700 kg/mm² for 5 hours to produce a sinter.

Figure 2:
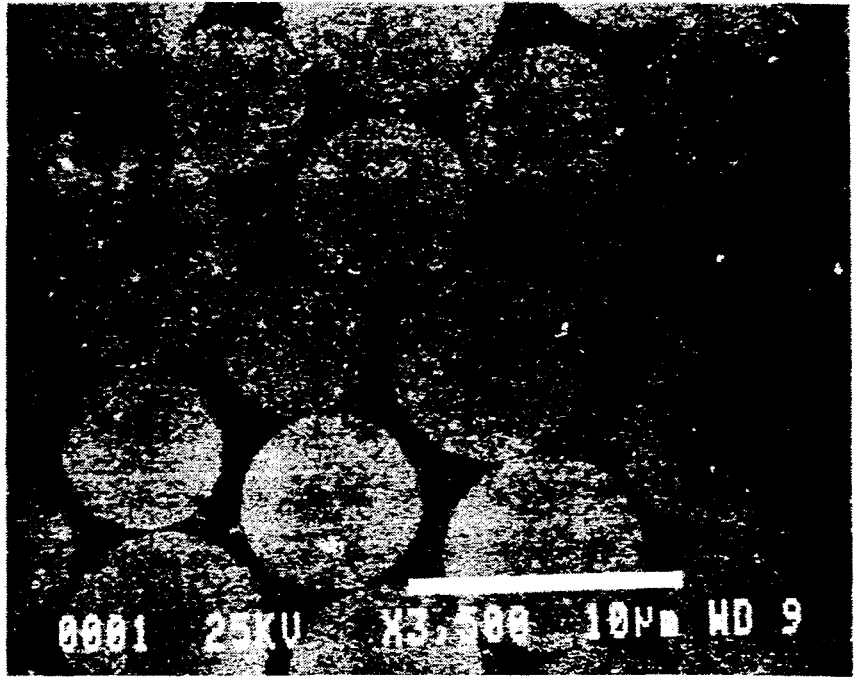
FIG. 2 is a micrograph showing the fracture of the sinter obtained in Example 2.

The resultant sinter had a flexural strength of 55 kg/mm² at room temperature and 45 kg/mm² at 1400° C. and a density of 2.8 g/cm³. As a result of the observation of the fracture of the sinter with a surface-reflection electron microscope, the sinter had a structure in which the partially deformed fibrous inorganic fibers were bonded to each other via the inorganic substances existing in the interface as shown in FIG. 2, while maintaining the fiber orientation of the plain weave fabric.

Comparative Example 3

The procedure of the Example 2 was repeated except that the inorganic fibers obtained in the Referential Example 1 were employed as such without heat treatment in the air.

The resultant sinter had a flexural strength of 35 kg/mm$^2$ at room temperature and 30 kg/mm$^2$ at 1400° C. and a density of 2.5 g/cm$^3$. As a result of the microscopic observation of the fracture of the sinter, gaps remained unfilled among the fibrous substances themselves.

What is claimed is:

1. An inorganic fiber sinter which consists essentially of
   (a) an inorganic substance (I) having a fibrous form, the inorganic substance (I) being selected from the group consisting of
      (i) an amorphous substance consisting essentially of Si, M, C and O,
      (ii) an agglomerate consisting essentially of crystalline ultrafine particles of $\beta$-SiC, MC, a solid solution of $\beta$-SiC with one or both of MC and MC$_{1-x}$, and amorphous SiO$_2$ and MO$_2$, the crystalline ultrafine particles having diameters of 50 nm or smaller, and
      (iii) a mixture of the amorphous substance (i) and the agglomerate (ii),
   the inorganic substance (I) containing 30 to 60 wt. % Si, 0.5 to 35 wt. % M, 25 to 40 wt. % C and 0.01 to 30 wt. % O, and
   (b) an inorganic substance (II) filling space formed by the fibrous form, the inorganic substance (II) being selected from the group consisting of
      (iv) an amorphous substance consisting essentially of Si, M and O,
      (v) a crystal agglomerate consisting essentially of crystalline SiO$_2$ and MO$_2$, and
      (vi) a mixture of the amorphous substance (iv) and the crystal agglomerate (v),
   the inorganic substance (II) containing 20 to 65 wt. % Si, 0.3 to 40 wt. % M, 0 to 5 wt. % C and 30 to 55 wt. % O,
   wherein M is Ti or Zr and x is a number of more than 0 to less than 1,
   the inorganic substance (I) being contained in the sinter in a volumetric content of 85 to 99%.

2. An inorganic fiber sinter which consists essentially of
   (a) an inorganic substance (III) having a fibrous form, the inorganic substance (III) being selected from the group consisting of
      (A) an amorphous substance consisting essentially of Si, C and O,
      (B) an agglomerate consisting essentially of crystalline ultrafine particles of $\beta$-SiC and amorphous SiO$_2$, the crystalline ultrafine particles having diameters of 50 nm or smaller, and
      (C) a mixture of the amorphous substance (A) and the agglomerate (B),
   the inorganic substance (III) containing 30 to 60 wt. % Si, 25 to 40 wt. % C and 0.01 to 30 wt. % O, and
   (b) an inorganic substance (IV) filling space formed by the fibrous form, the inorganic substance (IV) being selected from the group consisting of
      (D) an amorphous substance consisting essentially of Si and O,
      (E) a crystal agglomerate consisting essentially of crystalline SiO$_2$, and
      (F) a mixture of the amorphous substance (D) and the crystal agglomerate (E),
   the inorganic substance (IV) containing 20 to 65 wt. % Si, 0 to 5 wt. % C and 30 to 60 wt. % O,
   the inorganic substance (III) being contained in the sinter in a volumetric content of 85 to 99%.

3. The inorganic fiber sinter according to claim 1, wherein the inorganic substance (I) has a diameter of 5 to 20 $\mu$m.

4. The inorganic fiber sinter according to claim 2, wherein the inorganic substance (III) has a diameter of 5 to 20 $\mu$m.

* * * * *